UNITED STATES PATENT OFFICE.

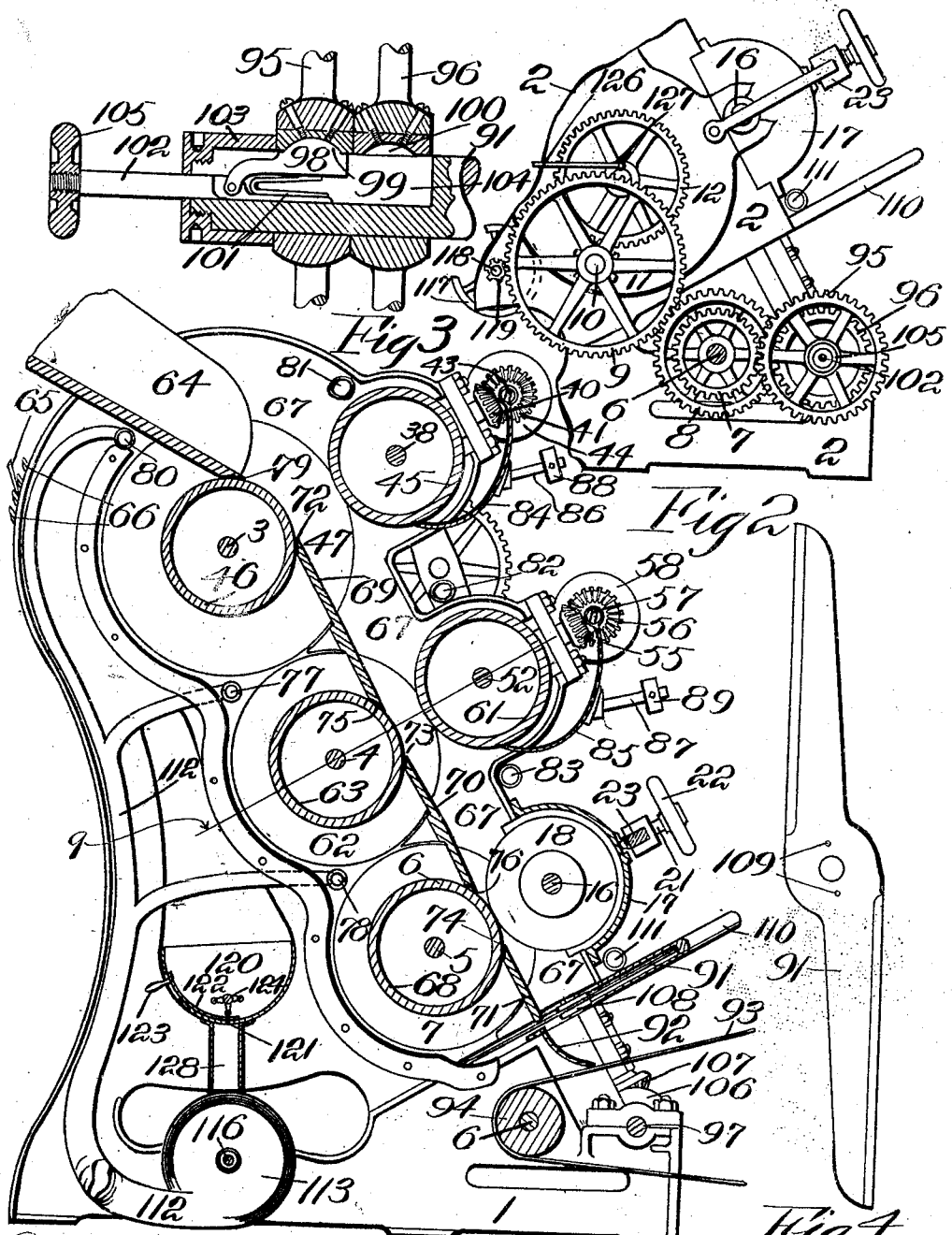
C. A. HULTIN.
DOUGH DIVIDER AND SCALER.
APPLICATION FILED MAY 24, 1907.
987,231.
Patented Mar. 21, 1911.
2 SHEETS—SHEET 1.

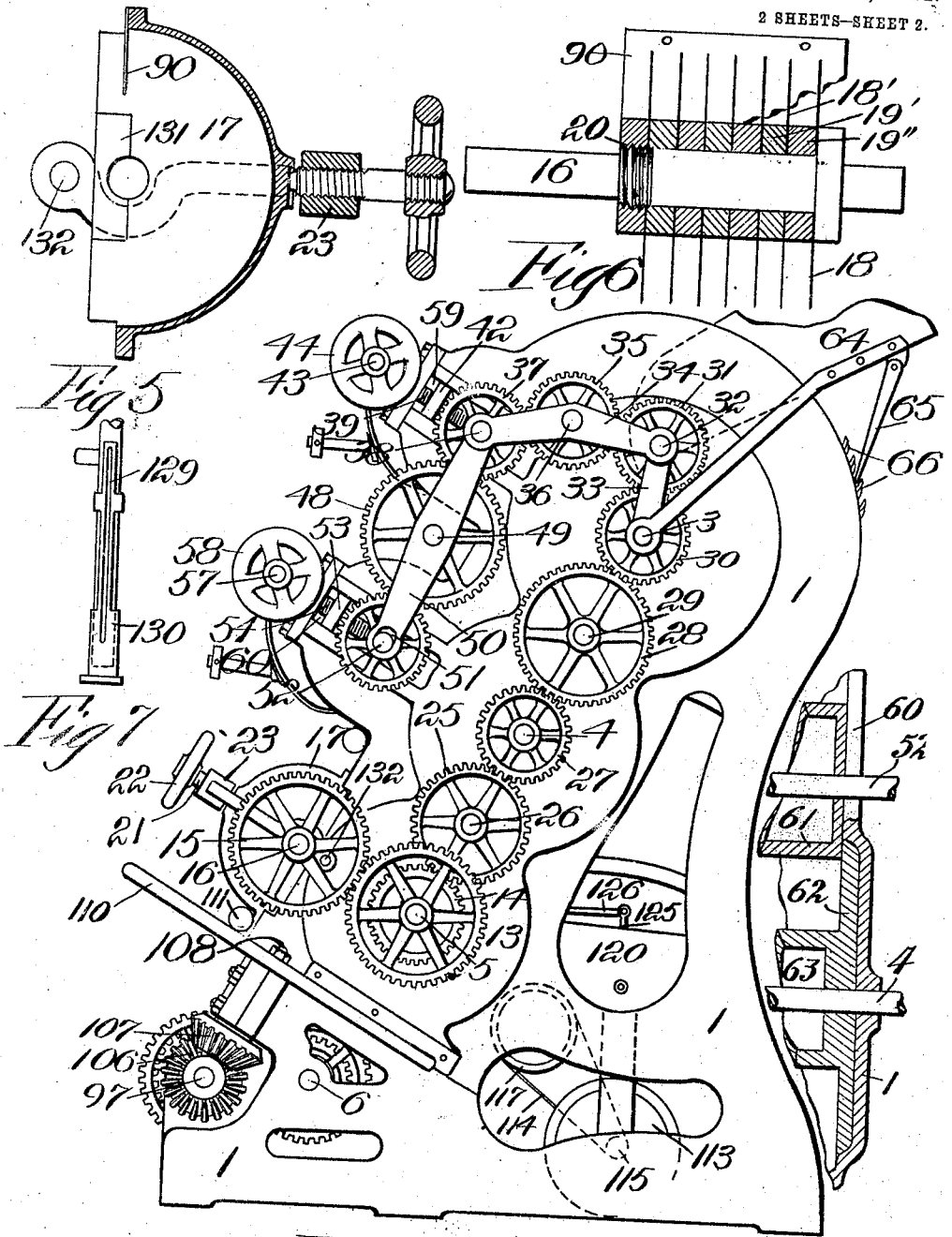

CHARLES AUGUST HULTIN, OF SEATTLE, WASHINGTON.

DOUGH DIVIDER AND SCALER.

987,231.  Specification of Letters Patent.  Patented Mar. 21, 1911.

Application filed May 24, 1907. Serial No. 375,557.

*To all whom it may concern:*

Be it known that I, CHARLES AUGUST HULTIN, a citizen of the United States, and residing at No. 229 North Broadway, in the city of Seattle, county of King, and State of Washington, have invented a new and useful Dough Divider and Scaler, of which the following is a clear and concise specification.

My invention relates primarily to a machine for dividing dough into pieces of a pre-determined weight without substantially compressing the dough thus divided; a machine with great latitude in cutting pieces of dough into from the smallest sizes to the largest loaves used in a bakery; secondarily to afford a means for preventing the dough while being handled with my device from sticking on the several parts, to afford a means for changing the speeds of the knives and cutters expeditiously.

I am aware that there are machines for dividing dough into pieces of pre-determined size, but in most instances the dough while being handled is compressed, thus reducing its "life".

The time used in changing the cutters and other devices in most machines is substantially lessened by the construction of my device as illustrated in the accompanying drawings, and hereinafter more fully set forth.

I have provided a durable machine with an extremely great capacity.

The objects of my invention are to provide a dough divider which will not compress the dough while being divided, to afford a means for cutting pieces of substantially uniform size; to change the size being cut at a minimum time and labor; to prevent dough from sticking to the rolls and frame-work. I accomplish this, as well as minor objects with the construction now preferred by me illustrated in the accompanying drawings, in which, Figure 1 is a vertically transverse section of my entire device. Fig. 2 is a fragmentary side elevation showing the driving and knife actuating gears. Fig. 3 is a fragmentary elevation and section showing the rapid change mechanism of said knife actuating gears. Fig. 4 is an elevation of a knife. Fig. 5 is a transverse section of a cutter hood and cutter bearings. Fig. 6 is a partial section and elevation of the cutters. Fig. 7 is a plan view of one of the nozzles of my device. Fig. 8 is a side elevation of my entire device.

Similar numerals refer to the several parts throughout the several views of the accompanying drawings.

I have provided a frame work comprising two side frame pieces 1 and 2 provided with apertures adapted to journal the top stationary feed roll shafting 3; the middle stationary feed roll shafting 4, and the lower stationary feed roll shafting 5, the drive shafting 6, which is provided with the gears 7 and 8 rigidly secured thereto. Said gear 8 being adapted to intermesh with the gear 9, which is supported by a stud 10, and rigidly secured to a pinion 11, which intermeshes with the gear 12, which is rigidly secured to said lower stationary feed roll shaft 5, which is adapted to drive the lower feed roll 6 having a flange 7 substantially flush with the inner surface of said side frame piece 1. Said lower feed roll shaft 5 is also provided at its opposite end with the gears 13 and 14; said gear 13 being adapted to intermesh with the gear 15, which is rigidly secured to the cutter shaft 16, which is journaled in the cutter hood 17, which is adapted to protect the cutters 18, which are rigidly secured to the cutter shaft 16 by means of collars 19 and the nut 20. It is obvious that said cutters 18 may be of any number by placing collars 19 of different widths there-between. Thus the cutter as 18' may be removed, as well as the collars 19' and 19'' and a collar of substantially the width of both the said collars 19' and 19'' as well as the thickness of said cutter 18' added thereto, and in a similar manner other combinations of cutters may be used. Said cutter hood 17 and the cutter shaft 16, as well as said gear 15, may be removed and another cutter hood as 17 and parts connected thereto may be substituted by loosening the hood screw 21 by means of a hand wheel 22, rigidly secured thereto, said hood screw being threaded adapted to fit the bail 23, being mounted on the pivots 132.

The aforesaid gear 14 is adapted to intermesh with the idler gear 25, which is supported by a stud 26, rigidly secured to said side and frame piece 1 and adapted to intermesh with the gear 27, which is rigidly secured to said middle stationary feed roll shaft 4, said gear 27 being adapted to intermesh with the idler gear 28, which is supported by means of the stud 29, rigidly secured to said side frame piece 1; said gear 28 being adapted to intermesh with the gear 30, which is rigidly secured to said top stationary feed roll shaft 3; said gear 30 is adapted to intermesh with the idler gear 31, which is supported by the pin 32 rotatably secured to the link 33 and the link 34; said idler gear 31 is adapted to intermesh with idler gear 35, which is journaled on the pin 36, which is secured to said link 34, the idler gear 35 being adapted to intermesh with the gear 37, which is rigidly secured to the top movable feed roll shaft 38, which may be adjusted relative to said top stationary feed roll shaft 3 by means of the screws 39 operated by the bevel gears 40 and 41. Said screws 39 are threaded and adapted to fit the bearing supports 42, said bevel gears 40 being rigidly secured to said screws 39, and said bevel gears 41 being rigidly secured to a hand wheel shaft 43, which is secured to the hand wheel 44. It is thus obvious that the movable top feed roll 45 may be raised and lowered relative to the top stationary feed roll 46, which is rigidly secured to said top stationary feed roll shaft and is provided with a flange 47. Said gear 37 is adapted to intermesh with an idler gear 48 which is supported by means of a pin 49 and link 50, which are provided with a slot 51 to fit the lower movable feed roll shaft 52, thus allowing an independent movement for adjustment of said shaft 38 and said shaft 52, and it is obvious that said shaft 38 may be raised or lowered relative to said shaft 3 and said gear 30 from which said gear 37, secured to said gear 38, is driven as said links 33 allow said pin 32 to swing concentric with said shaft 3 governed by the movement of said links 34, said shaft 52 is journaled in bearings 53, which are raised by the screws 54 and bevel gears 55 secured thereto, which intermeshes with the bevel gears 56 secured to the hand wheel shaft 57 which is provided with the hand wheel 58. Aforesaid bearings 42 are slidably mounted in the slots 59 provided in said side frame pieces 1 and 2 and are adapted to guide said feed roll. Said bearings 53 are slidably mounted in the slots 60 in said side frames 1 and 2 and are adapted to guide the bottom movable feed roll 61, which is secured to said shaft 52; said feed roll 61 is adapted to fit the side frames 1 and 2 on its ends, as well as between the flanges 62 of the middle feed roll 63, which is secured to said shaft 4. Thus the dough is fed from a hopper 64 which is pivotally connected to feed said dough at different speeds by means of pawls 65 adapted to engage teeth 66 provided on said side frames 1 and 2, to the top rolls 46 and 45, the ends of which snugly fit the flanges 47 of said roll 46, thus said flanges form moving sides of a chute 67 which has for the remainder of its side walls the inner surfaces of said side frame pieces 1 and 2, and for its bottom the rolls 46, 63 and a bottom roll 68, which is secured to said shaft 5, as well as chute pieces 69, 70 and 71, the upper ends of which are provided with scrapers 72, 73 and 74, which are adapted to remove any dough which may stick to said rolls 46, 63 and 68; the lower end of said chute pieces 69 and 70 being held slightly away from said rolls 63 and 68 to force slots 75 and 76 to permit flour from the nozzles 77 and 78 to enter therethrough to prevent dough from sticking to said rolls 63 and 68, said roll 46 being supplied with flour through the slot 79 formed between the lower end of said hopper 64 and said roll 46 and by the nozzle 80, said movable feed rolls 45 and 61 are supplied with flour from nozzle 83. To scrape dough which may have stuck on said movable rolls 45 and 61 I have scrapers 84 and 85 swingingly mounted on said shafts 43 and 57 and held in contact with said rolls by means of levers 86 and 87 and weights 88 and 89 secured thereto, and to remove dough which may stick on said cutters 18 I have provided a scraper 90 secured to said cutter hood 17. After the dough has passed through the chute and rolls and has been cut longitudinally by said cutters 18 a rotatably mounted knife 91 cuts the dough transversely, and the pieces thus cut gravitate over the apron 92 onto the conveyer belt 93, which is driven by a pulley 94 which is secured to said shaft 6. To change the speed of said knife 91 and to drive said knife I have provided loosely mounted gears 95 and 96 adapted to intermesh with said gears 7 and 8, which are also secured to said shaft 6 and driven thereby. It will be seen that as said gear 95 intermeshes with a smaller gear as 7 and the gear 96 intermeshes with a relatively larger gear as 8 that by driving the shaft 97 by said gear 95 that said shaft 97 and parts driven thereby will travel slower than when said gear 96 is made to drive said shaft 97, and by the construction illustrated in Fig. 3 of the accompanying drawings I have provided a slidably mounted feather key 98 adapted to yieldingly travel from a feather way 99 in said gear 95 to a feather way 100 in said gear 96 by overcoming the spring 101, which is secured to the rod 102, said key 98 is also pivotally secured to said rod 102, which is guided by an aperture in the cap 103 and the bottom of the keyway 104 and is operated by a knob 105 secured to the end thereof. The opposite end of said shaft 97 is provided with a bevel gear 106 intermeshing with the bevel gear 107, which is secured to the shaft 108 having said knife 91 secured thereto, which is driven by the dowels 109, which are proportioned to break off when foreign matter enters the chute 67, thus preventing said knife from being broken. I have provided a cover 110 to prevent accidents, having a connection 111 to keep said knife 91 supplied with flour.

The nozzles 78, 77, 80, 81, 82, 83 and connection 111 are connected with the discharge pipe 112 of a fan 113, which is driven by a belt 114 running on the pulley 115, secured to the shaft 116 of said fan 113, as well as by the pulley 117 secured to the shaft 118, which is provided with a pinion 119 adapted to intermesh with said gear 9. I have provided a sifter 120 having a slot 121 and a slot valve 122 operated by the shaker 124 which is oscillated by the lever 125 and link 126, which is secured to the crank 127 driven by said gear 12, to regulate the feed of flour into the suction pipe 128 of said fan 113. Thus it is obvious that the required amount of flour may be delivered to the rolls, cutters and knife of my device through the connections to said fan 113 and through the several nozzles which are preferably provided with an adjustable slot 129 regulated by shifting the sleeve 130 shown in Fig. 7 of the accompanying drawings. It is obvious that by changing the relative speed of the cutters, knife and rolls that the dough supplied to my device may be handled without being compressed, and may be shredded if desired, and that I am enabled to cut pieces of dough of sizes greatly varying in weight, and by the use of the scrapers and flour supplying means I am able to handle dough which is wet and sticky before being supplied to my device. It is obvious that by the cutter shaft 16 being journaled in bearings 131 secured to said hood 17 that said hood and said cutter and parts attached thereto may be replaced and a shaft as 16 with a new combination of cutters as 18 may be substituted by loosening said hood screw 21 and swinging said bail 23 clear, which is facilitated by the pivotal connection 132 being of greater radial distance from the end of said screw 21 than the radius of said hood. I thus afford a rapid means for changing said cutters.

I do not wish to be limited to the specific construction set forth and illustrated in the accompanying drawings, but wish the liberty to depart from such details as are within the scope of my patent.

Having thus described my invention what I claim as new, and desire to secure by Letters Patent in the Patent Office of the United States, is:

1. In a machine for cutting dough, stationary feed rolls, a longitudinal cutter, means for adjusting said cutter by changing the number of cutters, a rotatably mounted knife adapted to cut the dough transversely and having its axis parallel to the travel of said dough.

2. In a machine for cutting dough stationary feed rolls having movable feed rolls adapted to feed dough therefrom, means for adjusting said movable rolls and means for driving said feed rolls, cutters adapted to cut the dough longitudinally, a rotatably mounted knife adapted to cut the dough transversely, means for blowing flour on said feed rolls, cutters and said knife, means for changing the speed of said knife relative to said feed rolls.

3. In a machine for cutting dough, stationary feed rolls having movable feed rolls adapted to feed dough therefrom, means for adjusting said movable feed rolls and means for driving said feed rolls, cutters adapted to cut the dough longitudinally, a rotatably mounted knife adapted to cut the dough transversely, means for blowing flour on said feed rolls, cutters and said knife, means for changing the number of cutters.

4. In a dough cutting machine, feed rolls adapted to feed the dough to cutters and a knife, means for changing the speed of said knife by a movable feather key, accessible from the exterior.

5. In a dough cutting machine feed rolls adapted to feed the dough to cutters and a knife means for changing the speed of said knife by a movable feather key, a fan adapted to discharge flour through nozzles for the purpose set forth.

6. In a dough cutting machine feed rolls and a knife means for changing the speed of said knife by a movable feather key, a fan adapted to discharge flour through nozzles, means for supplying and regulating the flour supplied to said fan by a sifter.

7. In a dough cutting machine, feed rolls and a knife means for changing the speed of said knife by a movable feather key, a fan adapted to discharge flour through nozzles, means for supplying and regulating the flour supplied to said fan.

8. In a machine for cutting dough, feed rolls driven by a train of gears means for changing the distance between the centers of movable feed rolls and the stationary feed rolls without changing the gears, a hopper adapted to supply dough to said feed rolls, a pivotal connection to said hopper concentric with the upper stationary feed roll, side frames, teeth secured thereto, pawls adapted to engage said teeth to change the slant of said hopper.

9. In a machine for cutting dough, feed rolls driven by a chain of gears, means for changing the distance between the centers of movable feed rolls and the stationary feed rolls without changing the gears, a hopper adapted to supply dough to said feed rolls, a pivoted connection to said hopper concentric with the upper stationary feed roll, a cutter hood provided with bearings, means for changing said cutter hood, cutters and parts attached thereto by loosening the hood-screw, and by swinging the bail secured thereto clear.

10. In a dough cutting machine and plurality of feed rolls, dough cutters supplied by said dough feed rolls, nozzles disposed adjacent to said cutters and feed rolls and a fan adapted to feed said rolls with flour preventing the dough from sticking to said cutters and feed rolls.

In testimony whereof I have signed my name to this specification in the presence of two witnesses.

CHARLES AUGUST HULTIN.

Witnesses:
  GEORGE W. RUGBY,
  ELLA BARR.